US012255391B2

(12) United States Patent
Zhang et al.

(10) Patent No.: US 12,255,391 B2
(45) Date of Patent: Mar. 18, 2025

(54) FEED NETWORK AND BASE STATION ANTENNA

(71) Applicant: Kunshan Luxshare RF Technology Co., Ltd., Jiangsu (CN)

(72) Inventors: WanQiang Zhang, Kunshan (CN); ChengYu Xu, Kunshan (CN); KangNing Lv, Kunshan (CN); ZhenHua Li, Kunshan (CN); WenKai Xu, Kunshan (CN); ZhengGuo Zhou, Kunshan (CN); Gang Zhou, Kunshan (CN)

(73) Assignee: Kunshan Luxshare RF Technology Co., Ltd., Kunshan (CN)

( * ) Notice: Subject to any disclaimer, the term of this patent is extended or adjusted under 35 U.S.C. 154(b) by 449 days.

(21) Appl. No.: 17/846,456

(22) Filed: Jun. 22, 2022

(65) Prior Publication Data

US 2023/0038700 A1 Feb. 9, 2023

(30) Foreign Application Priority Data

Jul. 29, 2021 (CN) ........................ 202110862577.3

(51) Int. Cl.

*H01Q 1/50* (2006.01)
*H01Q 1/24* (2006.01)
*H01Q 21/00* (2006.01)
*H01Q 21/24* (2006.01)

(52) U.S. Cl.

CPC ............... *H01Q 1/50* (2013.01); *H01Q 1/246* (2013.01); *H01Q 21/0075* (2013.01); *H01Q 21/24* (2013.01)

(58) Field of Classification Search

CPC ...... H01Q 1/246; H01Q 1/50; H01Q 21/0075; H01Q 21/24; H01Q 21/26

See application file for complete search history.

(56) References Cited

U.S. PATENT DOCUMENTS

2019/0334636 A1 10/2019 Li et al.

FOREIGN PATENT DOCUMENTS

CN 103840865 A 6/2014
CN 204632919 U 9/2015
CN 105247734 A 1/2016
CN 106711622 A 5/2017
CN 107331965 A 11/2017

(Continued)

*Primary Examiner* — Robert Karacsony

(74) *Attorney, Agent, or Firm* — Birch, Stewart, Kolasch & Birch, LLP

(57) ABSTRACT

Disclosed is a feed network, which includes a printed circuit board, two microstrip power dividers and two microstrip combiners, and the two microstrip power dividers and two microstrip combiners arranged on the printed circuit board. A microstrip structure of each microstrip power divider is configured to realize impedance matching. Input ends of the two microstrip power divider are configured as two input ends of the feed network, two input ends of each microstrip combiner are respectively connected to one output end of each microstrip power divider, and output ends of the two microstrip combiners are configured as two output ends of the feed network, so that a multiple-input multiple-output feed network is realized. Therefore, when the feed network is applied to a base station antenna, all the radiation units are arranged in a linear matrix to achieve the effect of miniaturization of the base station antenna.

13 Claims, 17 Drawing Sheets

4

(56) References Cited

FOREIGN PATENT DOCUMENTS

| | | | |
|---|---|---|---|
| CN | 107706512 | A | 2/2018 |
| CN | 207217747 | U | 4/2018 |
| CN | 109861007 | A | 6/2019 |
| CN | 211605396 | U | 9/2020 |
| CN | 111837294 | A | 10/2020 |
| CN | 112671481 | A | 4/2021 |
| CN | 112768954 | A | 5/2021 |

4

4

FEED NETWORK AND BASE STATION ANTENNA

CROSS REFERENCE TO RELATED APPLICATION

This application claims the priority benefit of Chinese Patent Application Serial Number 202110862577.3, filed on Jul. 29, 2021, the full disclosure of which is incorporated herein by reference.

BACKGROUND

Technical Field

The present disclosure relates to the technical field of communication, and more particularly to a feed network and a base station antenna.

Related Art

With the development of wireless technology, the performance requirements of base station antennas, such as multi-frequency and miniaturization, are getting higher and higher. How to achieve the best performance index of the directional diagram (that is, to improve the horizontal beam width) in each sub-band of the antennas on the same side has become a bottleneck in the current research and development of base station antennas.

At present, the existing technical schemes for improving the horizontal beam width of the base station antenna can be divided into four types. The first technical scheme is to use phase shifters 1 and 2 to respectively connect the staggered radiation units 3 in the same column, as shown in FIG. 1, which is a schematic diagram of the connection between a teed network and radiation units with a dislocation configuration in the same column according to an embodiment of the existing base station antenna, to improve the horizontal beam width of the base station antenna. However, the first technical scheme is only suitable for single-frequency base station antennas with a small number of ports. When the first technical scheme is applied to the multi-frequency and multi-port base station antenna, due to the dislocation of the radiation units, the radiation performance of the base station antennas with other frequency hands will be seriously affected.

The second technical scheme is to directly borrow the radiation unit 3 in the adjacent array through the phase shifters 1 and 2 respectively, as shown in FIG. 2, which is a schematic diagram of the connection between a feed network and radiation units with a borrowed configuration according to an embodiment of the existing base station antenna, or borrow the radiation unit 3 in the adjacent array through a power divider, to improve the horizontal beam width of the base station antenna. However, the second technical scheme can only be applied to scenarios where the number of radiation units of the base station antenna is large. When the second technical scheme is applied to the base station antenna with fewer radiation units, it will cause serious distortion in the three-dimensional directional diagram of the base station antenna, reduce the gain of the base station antenna, and affect the radiation performance of the base station antenna.

The third technical scheme is to improve the horizontal beam width of the base station antenna by adding parasitic radiation units. However, when the third technical scheme is applied to a multi-frequency base station antenna, there are the problems that the base station antenna occupies a large space and the cost increases. The fourth technical scheme is to realize the interoperability of radiation units through a conventional directional coupler or a 3 dB bridge to improve the horizontal beam width of the base station antenna. However, in the fourth technical scheme, the effect of improving the horizontal beam width is poor due to the small coupling coefficient of the conventional directional coupler, and there is the distortion, which cannot be eliminated, in the directional diagram of the base station antenna because of the inherent 90° phase difference between the input and output ports of the conventional directional coupler or 3 dB bridge.

Therefore, how to provide a technical scheme that can be applied to single-frequency, dual-frequency or multi-frequency base station antennas, and without limiting the number of radiation units of the base station antenna, to improve the horizontal beam width of the base station antenna, thereby achieving the miniaturization of the base station antenna and reducing the distortion in the directional diagram of the base station antenna, is an urgent problem to be solved by those skilled in the art.

SUMMARY

The embodiments of the present disclosure provide a feed network and a base station antenna, which can improve the horizontal beam width of the base station antenna, achieve the miniaturization of the base station antenna, and reduce the distortion in the directional diagram of the base station antenna.

In order to solve the above problems, the present disclosure is implemented as follows.

In a first aspect of the present disclosure, a feed network is provided for feeding two adjacent radiation units in the same row in an antenna array. The feed network includes a printed circuit board, two microstrip power dividers and two microstrip combiners, and the two microstrip power dividers and two microstrip combiners are arranged on the printed circuit board. A microstrip structure of each of the two microstrip power dividers is configured to realize impedance matching. Input ends of the two microstrip power dividers are configured as two input ends of the feed network, two input ends of each microstrip combiner are respectively connected to one output end of each microstrip power divider, and output ends of the two microstrip combiners are configured as two output ends of the feed network, so that a multiple-input multiple-output feed network is realized.

In a second aspect of the present disclosure, a base station antenna is provided, which includes at least two linear antenna arrays and the feed network of the embodiments of the present disclosure. The at least two linear antenna arrays are arranged in parallel, and each of the at least two linear antenna arrays includes a plurality of radiation units. The feed network of the embodiments of the present disclosure is disposed between the at least two linear antenna arrays, and the two output ends of the feed network are respectively connected to the two adjacent radiation units in the same row. The feed network further includes two phase shifters, the two phase shifters are respectively connected to the input ends of the two microstrip power dividers and radiation units not connected to the feed network to control signal phases of the plurality of radiation units.

In the embodiments of the present disclosure, by the connection relationship between the microstrip power dividers and the microstrip combiners, and the microstrip structure design, the feed network not only realizes impedance matching within the design frequency band, but also realizes the multiple inputs and the multiple outputs. In addition, the feed network can be applied to single-frequency, dual-frequency and multi-frequency base station antennas, wherein all the radiation units of the base station antenna are arranged in a linear matrix, and the radiation units are without the dislocation or borrowed configuration, so that it is easy for the base station antenna to carry out a structural layout, there is less impact on the radiation performance of base station antennas in other frequency bands, and the width of the base station antenna can be effectively reduced, thereby achieving the miniaturization of the base station antenna.

Furthermore, when the feed network is applied to single-frequency, dual-frequency, or multi-frequency base station antennas, by feeding two adjacent radiation units in the same row in the base station antenna, without limiting the number of radiation units of the base station antenna, the horizontal beam width of the base station antenna can be improved, the distortion in the directional diagram of the base station antenna is reduced, the gain of the base station antenna is increased, and the sector interference of the radiation channels between the base station antenna and other base station antennas on the same base station is reduced.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The FIGS. are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
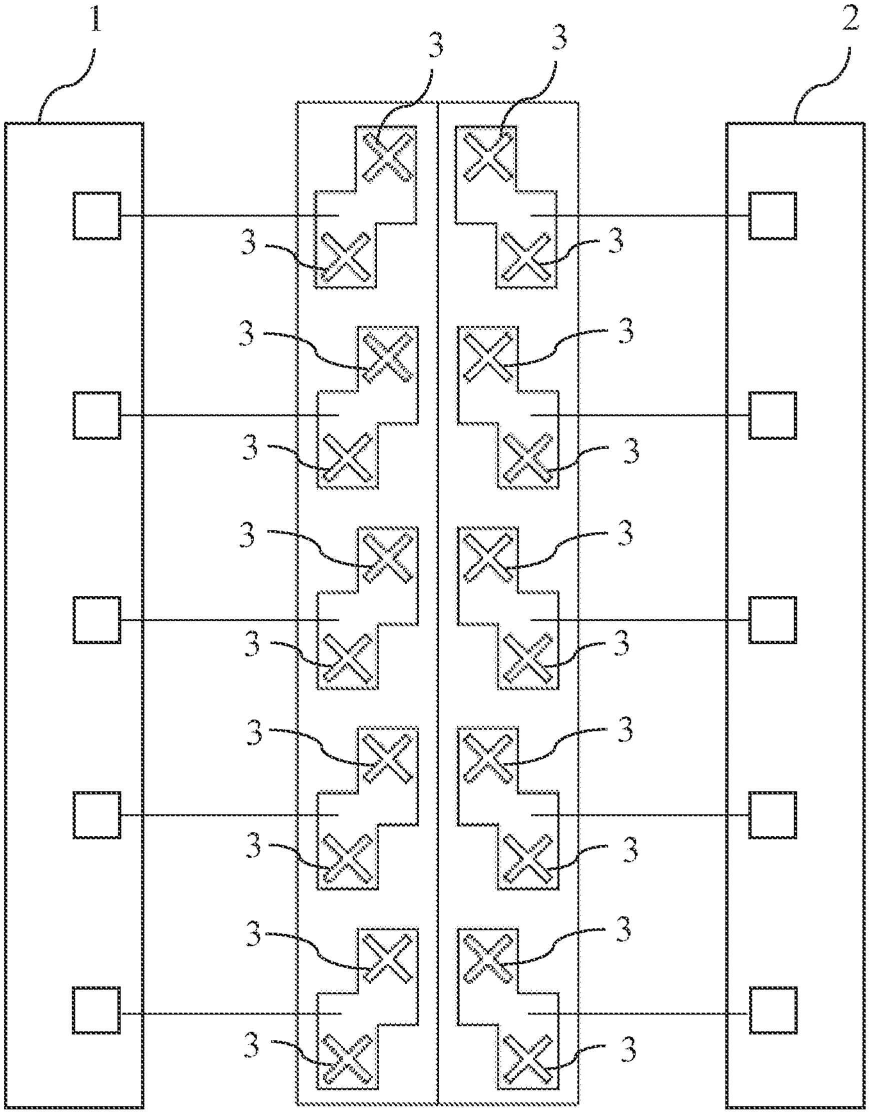
FIG. 1 is a schematic diagram of the connection between a feed network and radiation units with a dislocation configuration in the same column according to an embodiment of the existing base station antenna.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying ort the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

It must be understood that when a component is described as being “connected” or “coupled” to (or with) another component, it may be directly connected or coupled to other components or through an intermediate component. In contrast, when a component is described as being “directly connected” or “directly coupled” to (or with) another component, there are no intermediate components. In addition, unless specifically stated in the specification, any term in the singular case also comprises the meaning of the plural case.

In addition, the terms ‘first’, ‘second’ and the like in the embodiments of the present disclosure are used for distinguishing similar objects instead of distinguishing a specific sequence or a precedence order.

In the following embodiments, the same reference numerals are used to refer to the same or similar elements throughout the disclosure.

Figure 3:
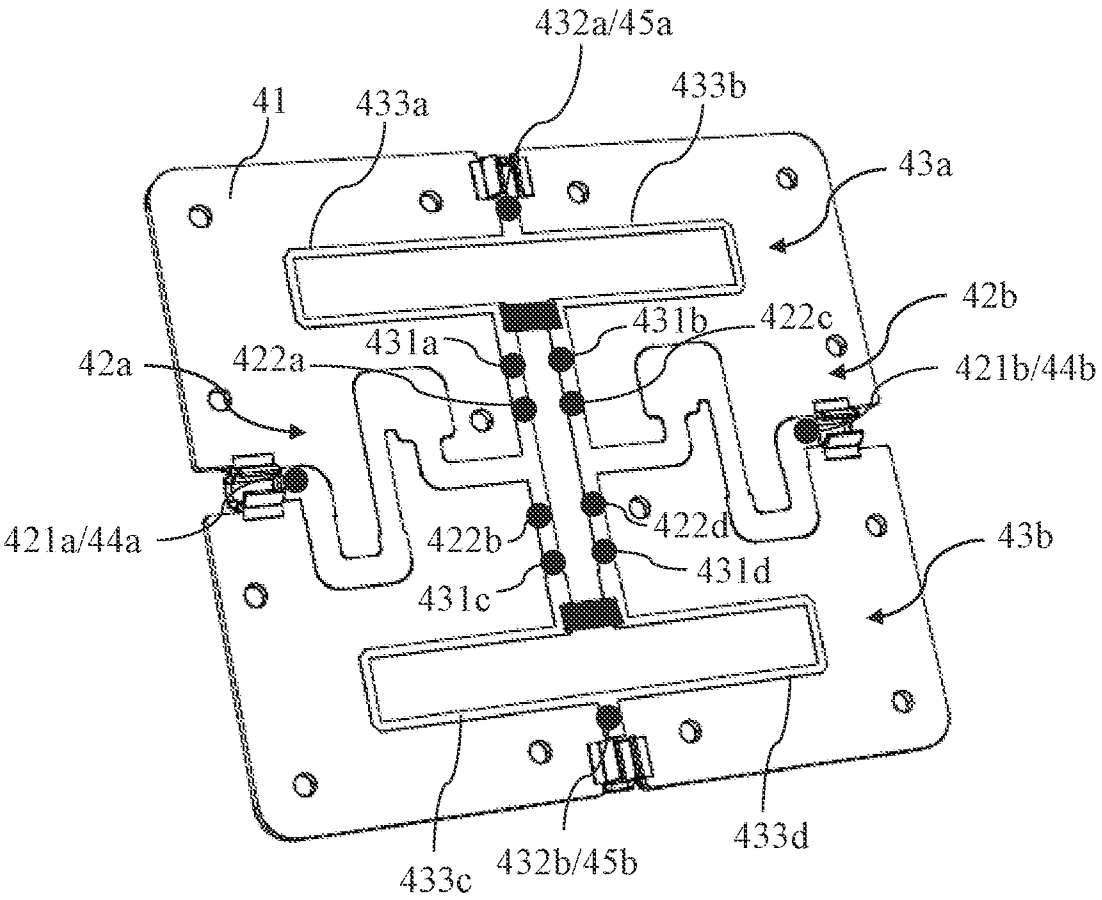
FIG. 3 is a three-dimensional schematic diagram of a feed network according to an embodiment of the present disclosure.

Please refer to FIG. 3, which is a three-dimensional schematic diagram of a feed network according to an embodiment of the present disclosure. As shown in FIG. 3, in this embodiment, the feed network 4 can be used for feeding two adjacent radiation units in the same row in an antenna array. The feed network 4 may comprise a printed circuit board 41, a microstrip power divider 42*a*, a microstrip power divider 42*b*, a microstrip combiner 43*a* and a microstrip combiner 43*b*. The microstrip power divider 42*a*, the microstrip power divider 42*b*, the microstrip combiner 43*a* and the microstrip combiner 43*h* are arranged on the printed circuit board 41, The microstrip structures of the microstrip power divider 42*a* and the microstrip power divider 42*h* are configured to realize impedance matching. The input end 421*a*, of the microstrip power divider 42*a* and the input end 421*b* of the microstrip power divider 42*b* are configured as the input end 44*a* and the input end 44*b* of the feed network 4, The input end 431*a* and the input end 431*b* of the microstrip combiner 43*a* are respectively connected to the output end 422*a* of the microstrip power divider 42*a* and the output end 422*c* of the microstrip power divider 42*b*, and the input end 431*c* and the input end 431*d* of the microstrip combiner 43*b* are respectively connected to the output end 422*h* of the microstrip power divider 42*a* and the output end 422*d* of the microstrip power divider 42*b* (that is, the two input ends of the microstrip combiner 43*a* and the microstrip combiner 43*h* are connected to one output end of the microstrip power divider 42*a* and one output end of the microstrip power divider 42*b*, respectively). The output end 432*a* of the microstrip combiner 43*a* and the output end 432*b* of the microstrip combiner 43*b* are configured as the output end 45*a* and the output end 45*b* of the feed network 4. Thus, a multiple-input multiple-output feed network is realized. In other words, by the cascade connection of the two power dividers and the two combiners (that is, two power dividers used in reverse), the two-input and two-output of the feed network 4 is realized. The feed network 4 is an active feed network.

It should be noted that the black dots in FIG. 3 and the following FIGS. 4 to 7 are used to indicate the positions of the input end 421*a*, the input end 421*b*, the output end 422*a*, the output end 422*b*, the output end 422*c*, the output end 422*d*, the input end 431*a*, input end 431*h*, input end 431*c*, input end 431*d*, output end 432*a*, output end 432*b*, the input end 44*a*, the input end 44*b*, the output end 45*a* and the output end 45*b*. The actual feed network 4 does not have the black dots.

In this embodiment, the microstrip structure of each of the microstrip power divider 42*a* and the microstrip power divider 42*b* may include multiple sections of curved microstrip transmission lines with different widths to realize impedance matching. The microstrip power divider 42*a* and the microstrip power divider 42*b* can be equal power dividers to realize a one-to-two equal power dividing network. The microstrip structures of the microstrip combiner 43*a* and the microstrip combiner 43*b* can also be used to realize impedance matching. The microstrip combiner 43*a* and the microstrip combiner 43*b* can be equal combiners (that is, the branch sections 433*a* and 433*b* of the microstrip combiner 43*a* have the same width, and the branch sections 433*c* and 433*d* of the microstrip combiner 43*b* have the same width). However, the microstrip power divider 42*a*, the microstrip power divider 42*b*, the microstrip combiner 43*a*, and the microstrip combiner 43*b* of this embodiment are not used to limit the present disclosure, and the microstrip structure and type of each of the microstrip power divider 42*a*, the microstrip power divider 42*b*, the microstrip combiner 43*a*, and the microstrip combiner 43*b* can be adjusted according to actual needs. The microstrip combiner 43*a* and the microstrip combiner 43*b* are Wilkinson combiners, and the resistance value of each chip resistor, as shown by the black block in the drawing, can be, but not limited to, 100Q. The resistance value of the chip resistor of each Wilkinson combiner can be adjusted according to actual needs.

Figure 4:
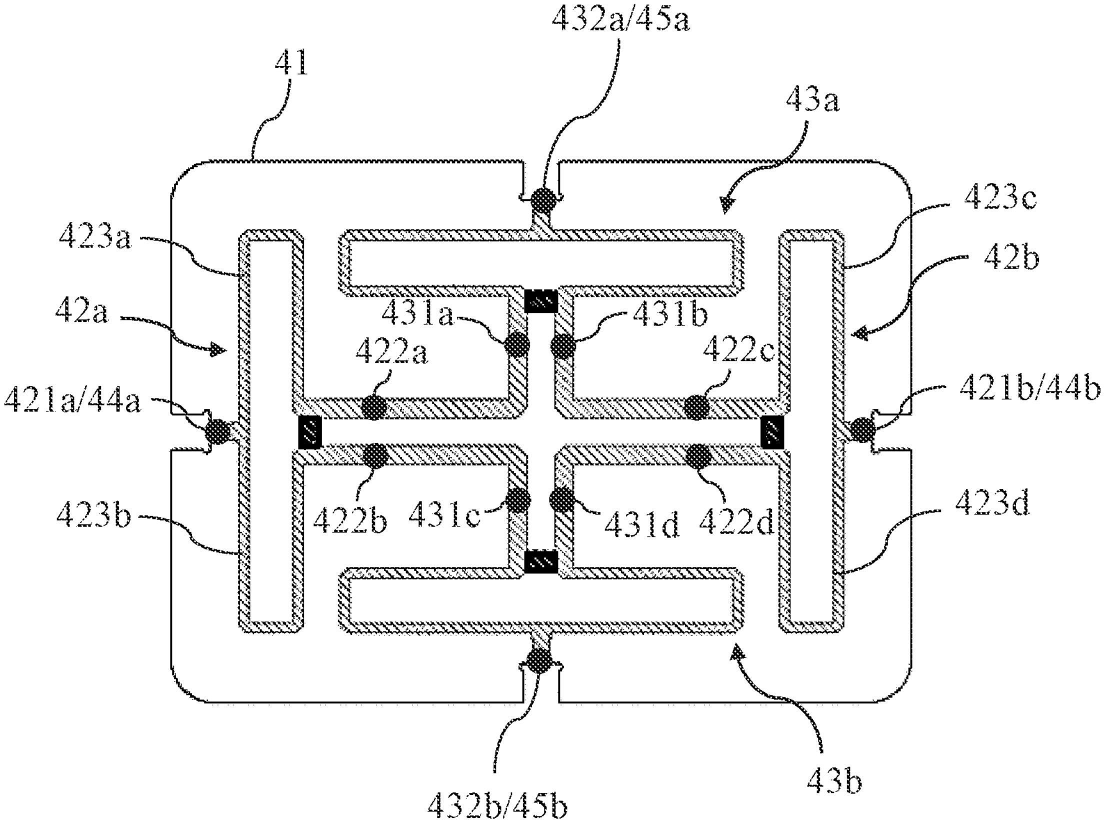
FIG. 4 is a three-dimensional schematic diagram of a feed network according to another embodiment of the present disclosure.

In one embodiment, please refer to FIG. 4, which is a three-dimensional schematic diagram of a feed network according to another embodiment of the present disclosure. As shown in FIG. 4, the microstrip power divider 42*a* and the microstrip power divider 42*b* are Wilkinson power dividers, and the microstrip combiner 43*a* and the microstrip combiner 43*b* are Wilkinson combiners. In more detail, the microstrip power divider 42*a* and the microstrip power divider 42*b* are Wilkinson equal power dividers (that is, the widths of the branch sections 423*a* and 423*b* of the microstrip power divider 42*a* are the same, and the widths of the branch sections 423*c* and 423*d* of the microstrip power divider 42*b* are the same), and the Wilkinson equal dividers can be used in reverse to form the microstrip combiner 43*a* and the microstrip combiner 43*b*. The resistance value of the chip resistor of each of the Wilkinson power divider and the Wilkinson combiner (that is, the black block in the drawing) can be adjusted according to actual needs.

Figure 5:
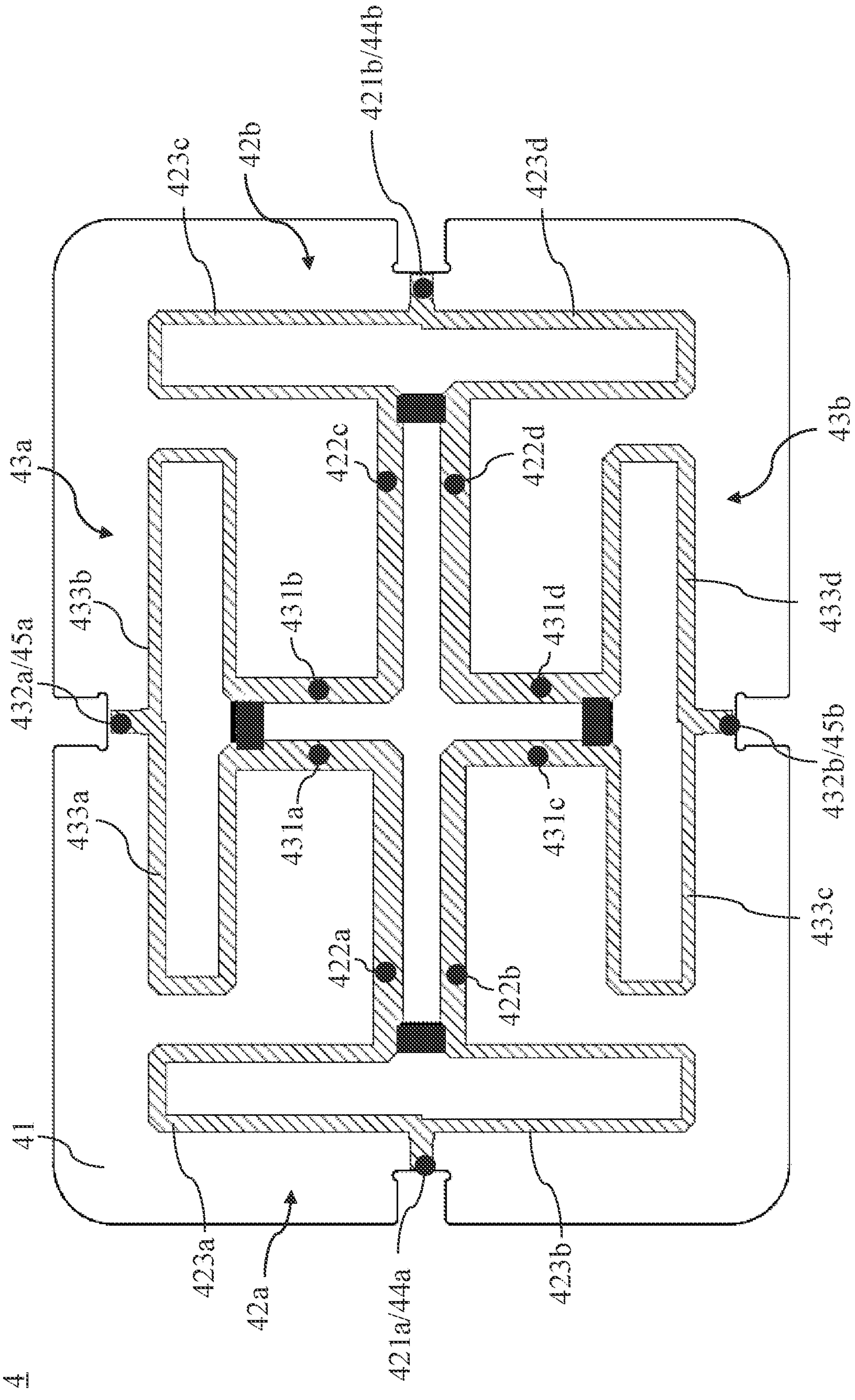
FIG. 5 is a three-dimensional schematic diagram of a feed network according to another embodiment of the present disclosure.

In one embodiment, please refer to FIG. 5, which is a three-dimensional schematic diagram of a feed network according to another embodiment of the present disclosure. As shown in FIG. 5, the microstrip power divider 42*a* and the microstrip power divider 42*b* are both unequal power dividers (that is, the widths of the branch sections 423*a* and 423*b* of the microstrip power divider 42*a* are different, and the widths of the branch sections 423*c* and 423*d* of 42*b* of the microstrip power divider 42*b* are different), the microstrip combiner 43*a* and the microstrip combiner 43*b* are both unequal combiners (that is, the widths of the branch sections 433*a* and 433*b* of the microstrip combiner 43*a* are different, and the widths of the branch sections 433*c* and 433*d* of the microstrip combiner 43*h* are different), In more detail, the microstrip power divider 42*a* and the microstrip power divider 42*b* are Wilkinson unequal power dividers, and the Wilkinson unequal power dividers are used in reverse to form the microstrip combiner 43*a* and the microstrip combiner 43*b*. The resistance value of the chip resistor of each Wilkinson unequal power divider, as shown by the black block in the drawing, can be adjusted according to actual needs.

In one embodiment, the microstrip power divider 42*a* is an unequal power divider, the microstrip power divider 42*b* is an equal power divider, the microstrip combiner 43*a* is an unequal combiner, and the microstrip combiner 43*b* is an equal combiner.

In one embodiment, the microstrip power divider 42*a* is an unequal power divider, the microstrip power divider 42*b* is an equal power divider, and the microstrip combiner 43*a* and the microstrip combiner 43*b* are both unequal combiners.

In one embodiment, the microstrip power divider 42*a* and the microstrip power divider 42*b* are both unequal power dividers, the microstrip combiner 43*a* is an unequal combiner, and the microstrip combiner 43*b* is an equal combiner.

Figure 6:
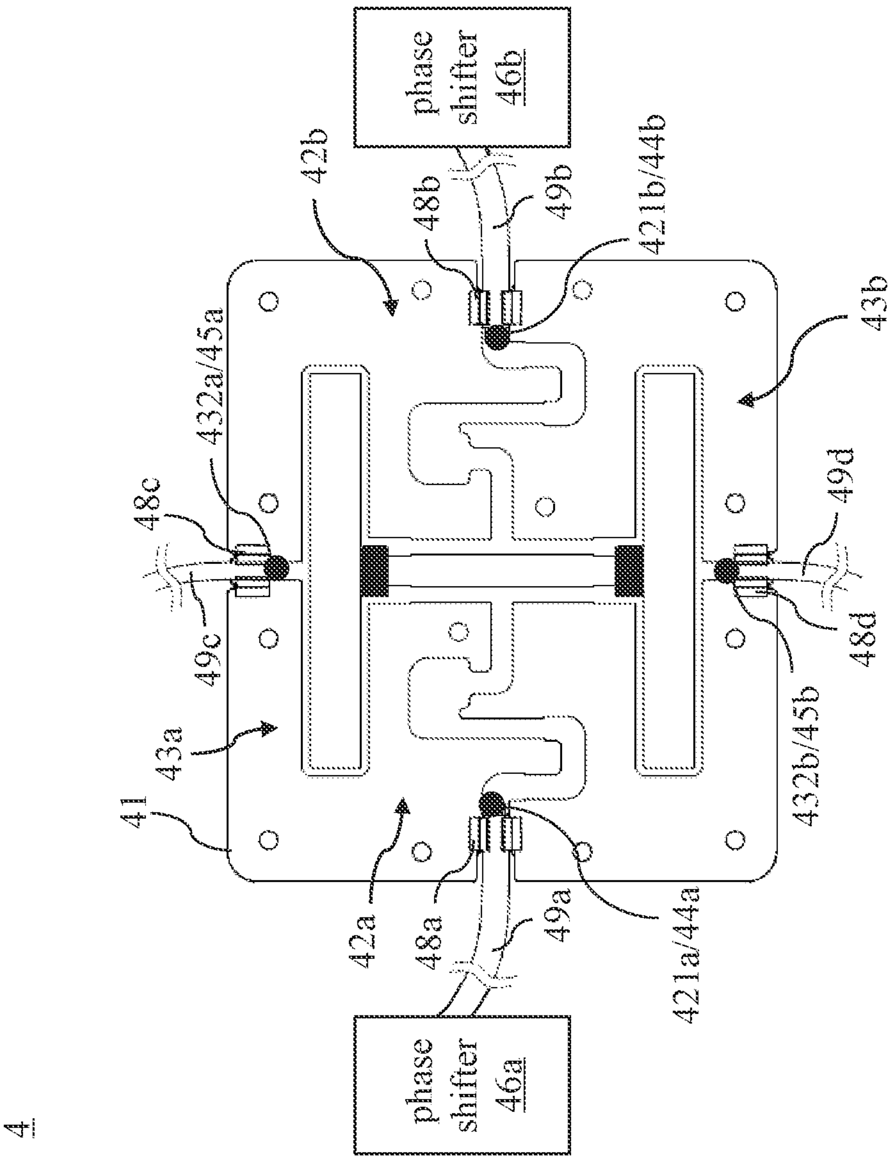
FIG. 6 is a schematic diagram of the connection of a feed network according to an embodiment of the present disclosure.

It can be seen from the above embodiments that part or all of the microstrip power divider 42*a* and the microstrip power divider 42*b* are unequal power dividers or equal power dividers, and part or all of the microstrip combiner 43*a* and the microstrip combiner 43*b* are unequal combiners or equal combiners. The types of microstrip power divider 42*a*, microstrip power divider 42*b*, microstrip combiner 43*a* and microstrip combiner 43*b* can be adjusted according to actual needs Please refer to FIG. 6, which is a schematic diagram of the connection of a feed network according to an embodiment of the present disclosure. As shown in FIG. 6, in this embodiment, the feed network 4 may further comprise two phase shifters 46*a* and 46*b*, which are respectively connected to the input end 421*a* of the microstrip power divider 42*a* and the input end 421*b* of the microstrip power divider 42*b* to adjust the phase difference between the output ends 45*a* and 45*b* of the feed network 4. In this embodiment, the printed circuit board 41 is provided with holding elements 48*a*, 48*b*, 48*c*, 48*d* for holding the cable 49*a*, the cable 49*b*, the cable 49*c*, and the cable 49*d*, which connect to the input end 44*a*, the input end 44*b*, the output end 45*a*, and the output end 45*b* of the feed network 4, respectively. One end of the cable 49*a* is connected to the phase shifter 46*a*, and the other end of the cable 49*a* is connected to the input end 44*a*. One end of the cable 49*b* is connected to the phase shifter 46*b*, and the other end of the cable 49*b* is connected to the input end 44*b*, One end of the cable 49*c* is connected to the output end 45*a*, and the other end of the cable 49*c* is connected to one radiation unit in the antenna array, which is not drawn. One end of the cable 49*d* is connected to the output end 45*b*, and the other end of the cable 49*d* is connected to another radiation unit in the antenna array, which is not drawn. It should be noted that the radiation units respectively connected to the cable 49*c* and the cable 49*d* need to be the two adjacent radiation units in the same row in the antenna array.

Figure 7:
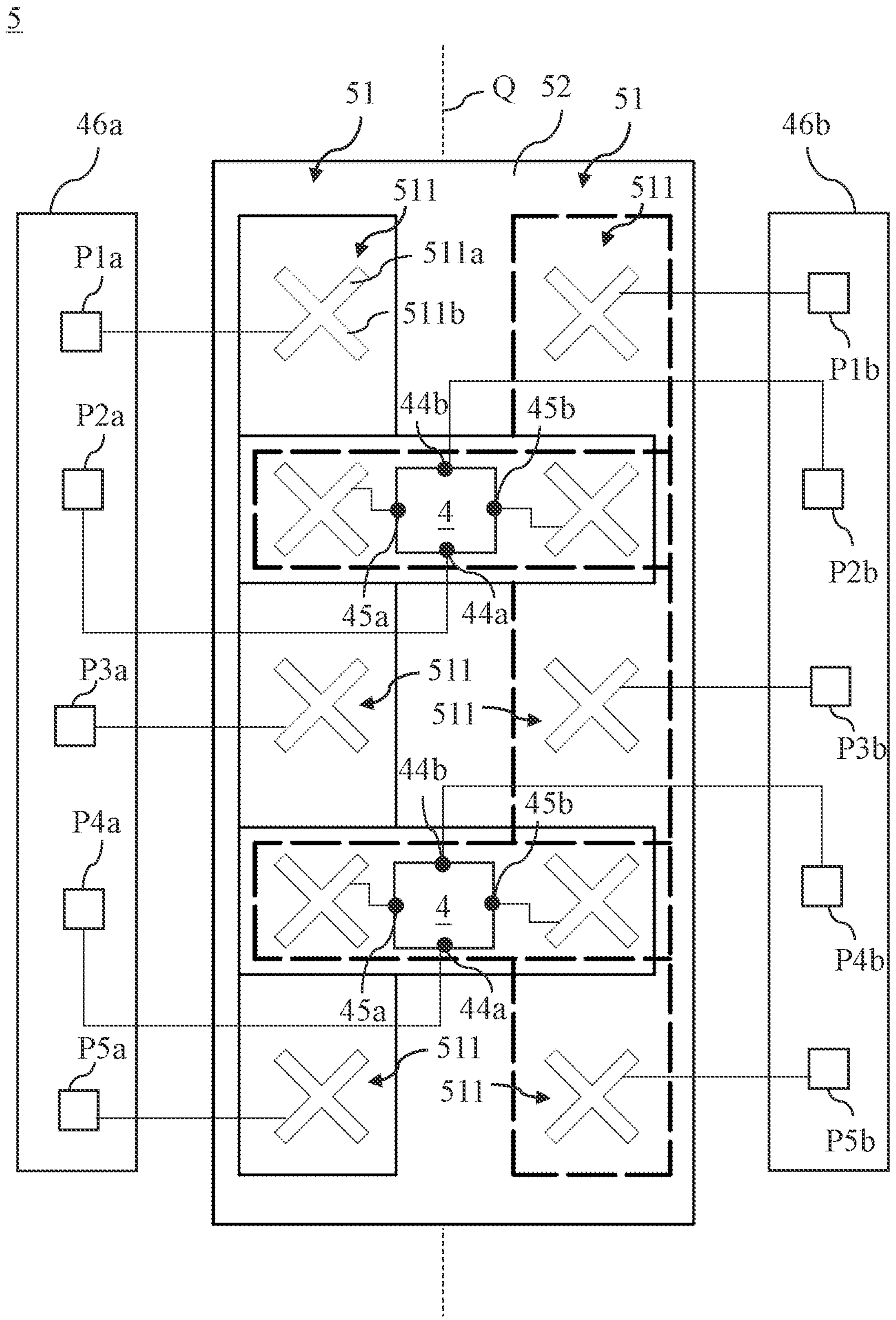
FIG. 7 is a schematic diagram of an embodiment of a base station antenna applying the feed network of the present disclosure.

Please refer to FIG. 7, which is a schematic diagram of an embodiment of a base station antenna applying the feed network of the present disclosure. As shown in FIG. 7, in this embodiment, the base station antenna 5 comprises at least two linear antenna arrays 51 and the feed network 4. The at least two linear antenna arrays 51 are arranged in parallel, and each of the at least two linear antenna arrays 51 comprises a plurality of radiation units 511. Therefore, the plurality of radiation units of the at least two linear antenna arrays 51 are arranged in a linear matrix arrangement, without the dislocation or borrowed configuration, so that it is easy for the base station antenna 5 to carry out a structural layout, and the width of the base station antenna 5 can be effectively reduced to achieve the miniaturization of the base station antenna 5. When the base station antenna 5 is a multi-frequency and multi-port base station antenna, and the plurality of radiation units 511 are arranged in the linear matrix, there is less impact on the radiation performance of base station antennas in other frequency bands. The radiation unit 511 can be a low-frequency radiation unit, and each linear antenna array 51 can comprise, but not limited to, five radiation units 511. The ten radiation units 511 are arranged in a 5×2 (that is, five rows and two columns) linear matrix. The number and types of radiation units 511 included in each linear antenna array 51 can be adjusted according to actual needs.

In this embodiment, the feed network 4 is disposed between the at least two linear antenna arrays 51, and the output end 45*a* and the output end 45*b* of the feed network 4 are respectively connected to the two adjacent radiation units 511 in the same row among the plurality of radiation units 511 arranged in a linear matrix, so that the function of sharing the two inputs and two outputs of the feeder network 4 in the entire frequency band (full frequency band) is realized. In this embodiment, the number of teed networks 4 may be, but not limited to, two, and the two feed networks are connected to two adjacent radiation units 511 in the second row and the fourth row in FIG. 8 respectively. However, this embodiment is not intended to limit the present disclosure, and the number of feed networks 4 can be adjusted according to actual needs. It should be noted that when the number of feed networks 4 is larger, the effect of improving the horizontal beam width of the base station antenna 5 can be improved, the gain of the base station antenna 5 can be increased, the radiation efficiency can be improved, and the sector interference of the radiation channels between the base station antenna and other base station antennas on the same base station can be avoided.

In this embodiment, besides connected to the input end 44*a* and the input end 44*b* of the feed network 4, the two phase shifters 46*a* and 46*h* included in the feed network 4 are further connected to the radiation unit 511 unconnected to the feed network 4, to control the signal phases of the plurality of radiation units 511. In more detail, the phase shifter 46*a* includes a plurality of phase-shifting output ends (i.e., the phase-shifting output ends P1*a*, P2*a*, P3*a*, P4*a* and P5*a*), wherein the phase-shifting output end Pia is connected to the first radiation unit 511 of the linear antenna array on the left in FIG. 7, the phase-shifting output end P2*a* is connected to the second radiation unit 511 of the linear antenna array 51 on the left in FIG. 7, the phase-shifting output end P3*a* the third radiation unit 511 of the linear antenna array 51 on the left in FIG. 7, the phase-shifting output end P4*a* is connected to the fourth radiation unit 511 of the linear antenna array 51 on the left in FIG. 7, and the phase-shifting output end P5*a* is connected to the fifth radiation unit 511 of the linear antenna array 51 on the left in FIG. 7. Therefore, the phase shifter 46*a* can be used to control the signal phases of the multiple radiating units 511 of the linear antenna array on the left in FIG. 7. The phase shifter 46*b* includes a plurality of phase-shifting output ends (i.e., the phase-shifting output ends P1*b*, P2*b*, P3*b*, P4*b* and P5*b*), wherein the phase-shifting output end P1*b* is connected to the first radiation unit 511 of the linear antenna array 51 on the right in FIG. 7, the phase-shifting output end P2*b* is connected to the second radiation unit 511 of the linear antenna array 51 on the right in FIG. 7, the phase-shifting output P3*b* is connected to the third radiation unit 511 of the linear antenna array 51 on the right in FIG. 7, the phase-shifting output end P4*b* is connected to the fourth radiation unit 511 of the linear antenna array 51 on the right in FIG. 7, and the phase-shifting output end P5*b* is connected the fifth radiation unit of the linear antenna array 51 on the right in FIG. 7. Therefore, the phase shifter b can be used to control the signal phases of the multiple radiation units 511 of the linear antenna array 51 on the right in FIG. 7.

Since the feed network 4 is of an equiphase design, the signal phases of the phase-shifted output end Pia and the phase-shifted output end P1*b* are the same, but the signal amplitudes of the phase-shifted output end P1*a* and the phase-shifted output end P1*b* are different; the signal phases of the phase-shifted output end P2*a* and the phase-shifted output end P2*b* are the same, but the signal amplitudes of the phase-shifted output end. P2*a* and the phase-shifted output end P2*b* are different; the signal phases of the phase-shifted output end P3*a* and the phase-shifted output end P3*b* are the same, but the signal amplitudes of the phase-shifted output end P3*a* and the phase-shifted output end P3*b* are different; the signal phases of the phase-shifted output end P4*a* and the phase-shifted output end P4*b* are the same, but the signal amplitudes of the phase-shifted output end Na and the phase-shifted output end P4*b* are different; the signal phases of the phase-shifted output end P5*a* and the phase-shifted output end P5*b* are the same, but the signal amplitudes of the phase-shifted output end P5*a* and the phase-shifted output end P5*b* are different.

In an embodiment, each of the plurality of radiation units 511 is a single-polarization radiation unit. Since each single-polarization radiation unit only has a single polarization direction, the number of the feed network 4 can be a positive integer.

In one embodiment, each of the plurality of radiation units 511 is a dual-polarization radiation unit, and each dual-polarization radiation unit includes a first dipole 511*a* and a second dipole 511*b* whose polarization directions are orthogonal to each other. Since a single feed network 4 is shared by the dipoles of the same polarization direction in two adjacent radiation units 511 in the same row, the number of feed networks 4 can be, but not limited to, two, and the two feed network 4 are respectively used to feed the first dipole 511*a* and the second dipole 511*b* with different polarization directions in two adjacent radiation units 511 in the same row. The first dipole 511*a* is a dipole with a polarization direction of +45°, and the second dipole 511*b* is a dipole with a polarization direction of −45°. In another example, the first dipole 511*a* is a dipole with a horizontal polarization direction, and the second dipole 511*b* is a dipole with a vertical polarization direction. It should be noted that when the radiation units 511 are dual-polarization radiation units, the number of the feed network 4 can be a positive even number.

It should be noted that each radiation unit 511 in FIG. 7 is a dual-polarization radiation unit, and each dual-polarization radiation unit includes a first dipole 511*a* with a polarization direction of +45° and a second dipole 511*b* with a polarization direction of −45°. Therefore, the number of feed network 4 is four, wherein two feed networks 4 are +45-degree polarized feed networks, and the other two feed networks 4 are −45-degree polarized feed networks. One +45-degree polarized feed network and one −45-degree polarized feed network are respectively connected to the first dipole 511*a* and the second dipole 511*b* with different polarization directions in the two adjacent radiation units 511 in the second row in FIG. 7, and another +45-degree polarized feed network and another −45-degree polarized feed network are respectively connected to the first dipole 511*a* and the second dipole 511*b* with different polarization directions in the two adjacent radiation units 511 in the fourth row in FIG. 7. In order to avoid the complexity of the drawing in FIG. 7, only the two 45-degree polarized feed networks, which are connected to the first dipoles 511*a* with the polarization direction of +45° of the two adjacent radiation units 511 in the second and fourth rows respectively, are drawn in FIG. 7. In one embodiment, the base station antenna 5 further comprises a reflector 52, the at least two linear antenna arrays 51 are installed on the surface of the reflector 52, and the at least two linear antenna arrays 51 are distributed in an axial symmetry mode with the central axis Q of the reflector 52. In another embodiment, the at least two linear antenna arrays 51 are asymmetrically distributed along the central axis Q of the reflector 52 (that is, the distances between two adjacent radiation units 511 in the same row and the central axis Q are different).

Figure 8:
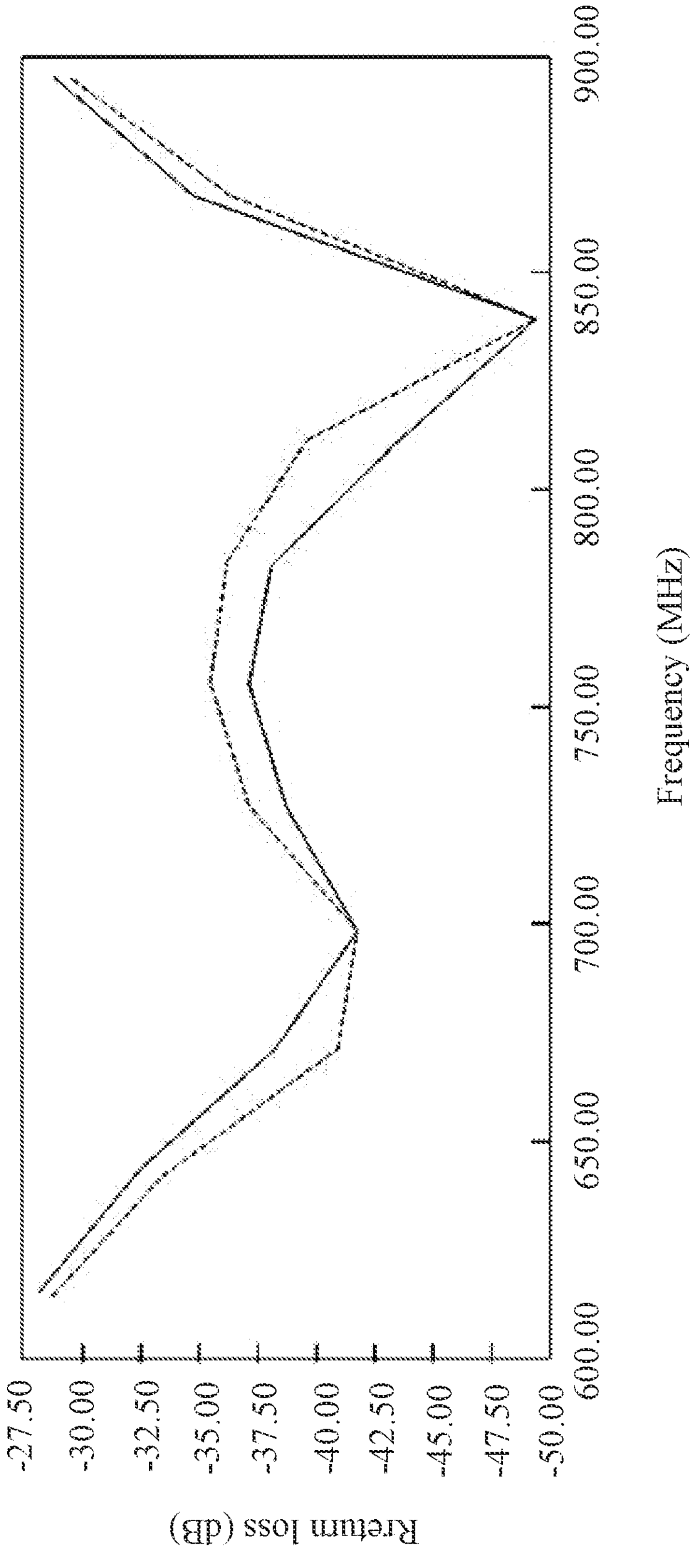
FIG. 8 is a schematic diagram of simulation results of the return loss of the base station antenna of FIG. 7.
Figure 9:
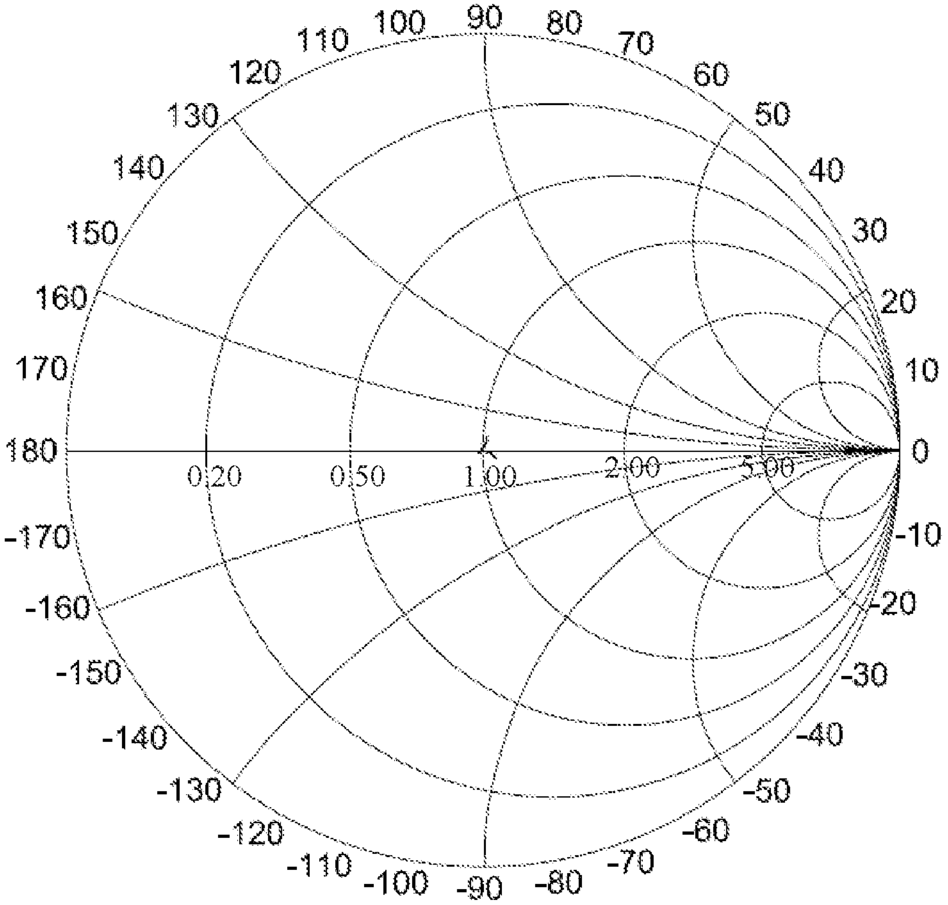
FIG. 9 is a schematic diagram of simulation results of the Smith chart of the base station antenna of FIG. 7.
Figure 10:
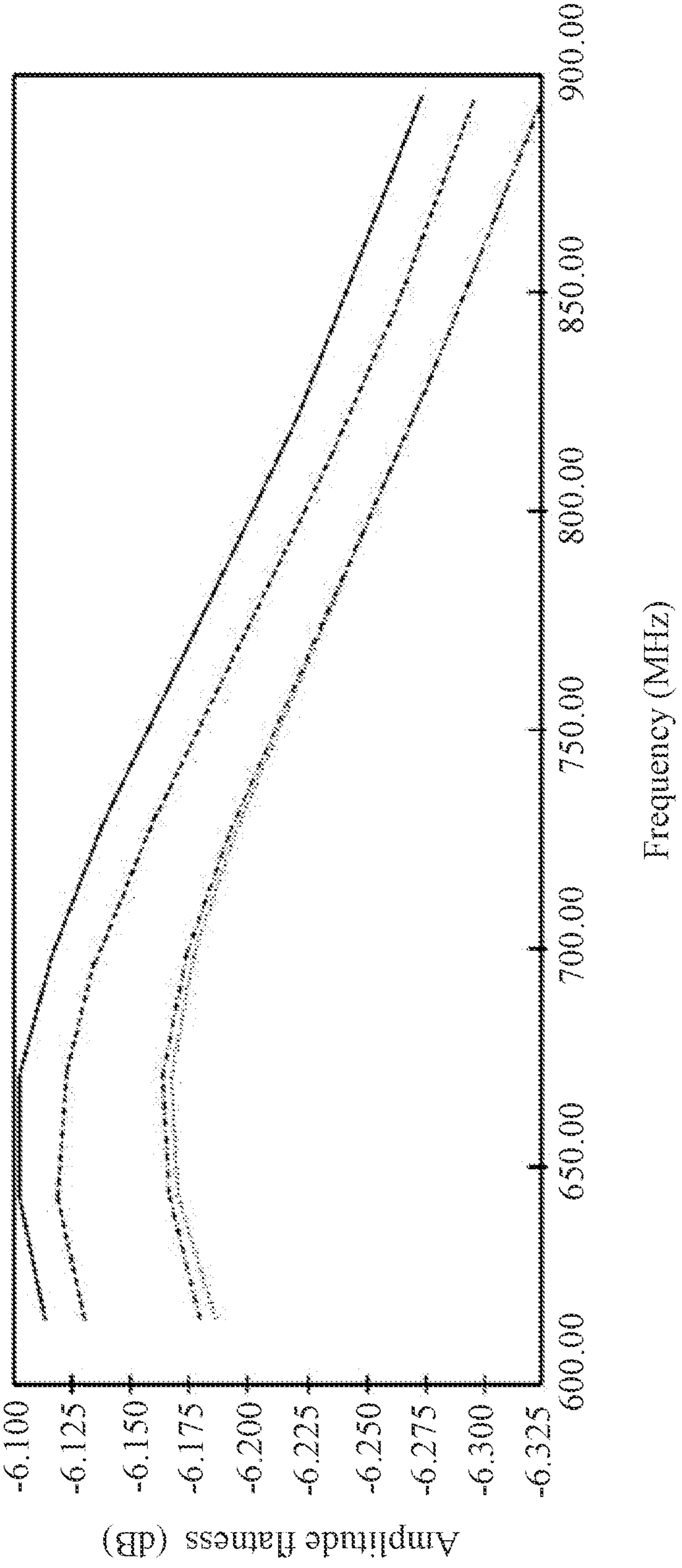
FIG. 10 is a schematic diagram of simulation results of the amplitude of the base station antenna of FIG. 7.
Figure 11:
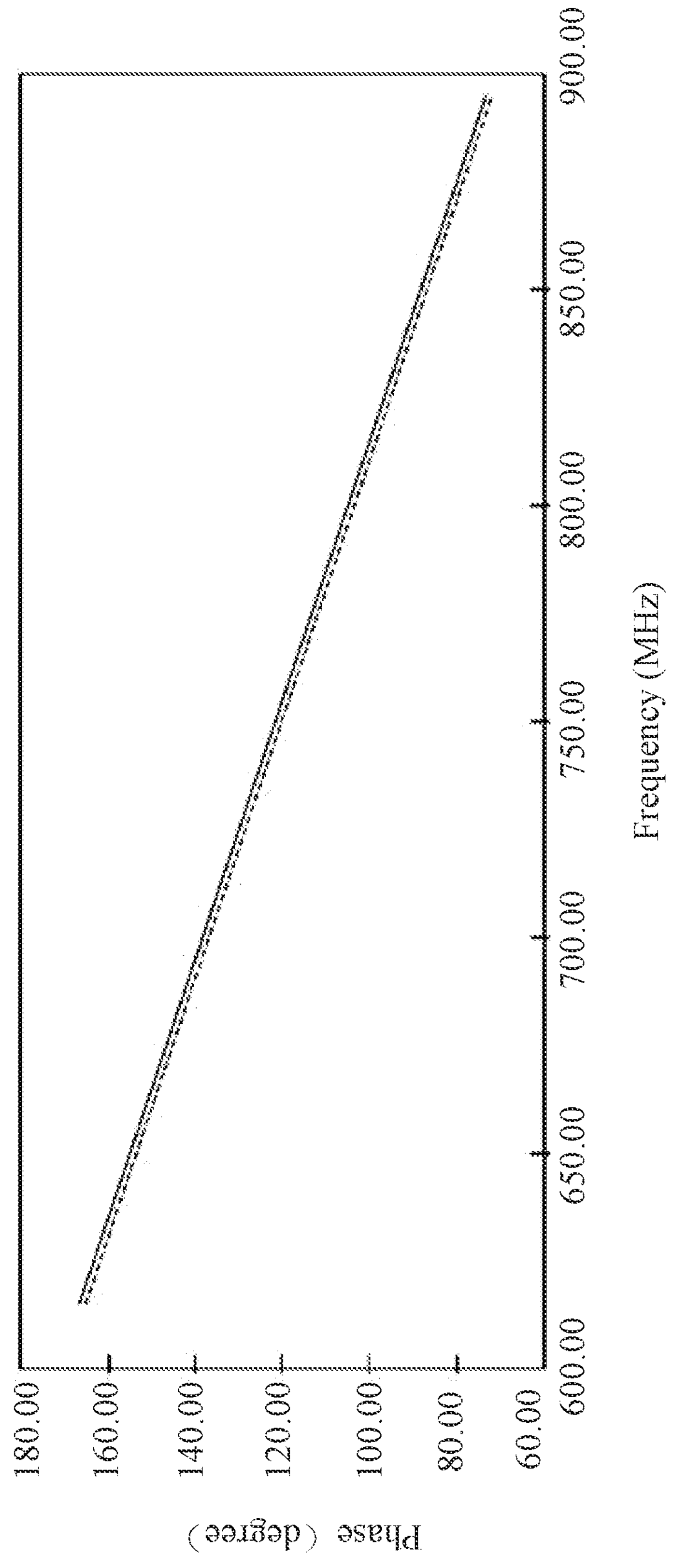
FIG. 11 is a schematic diagram of simulation results of the phase of the base station antenna of FIG. 7.
Figure 12:
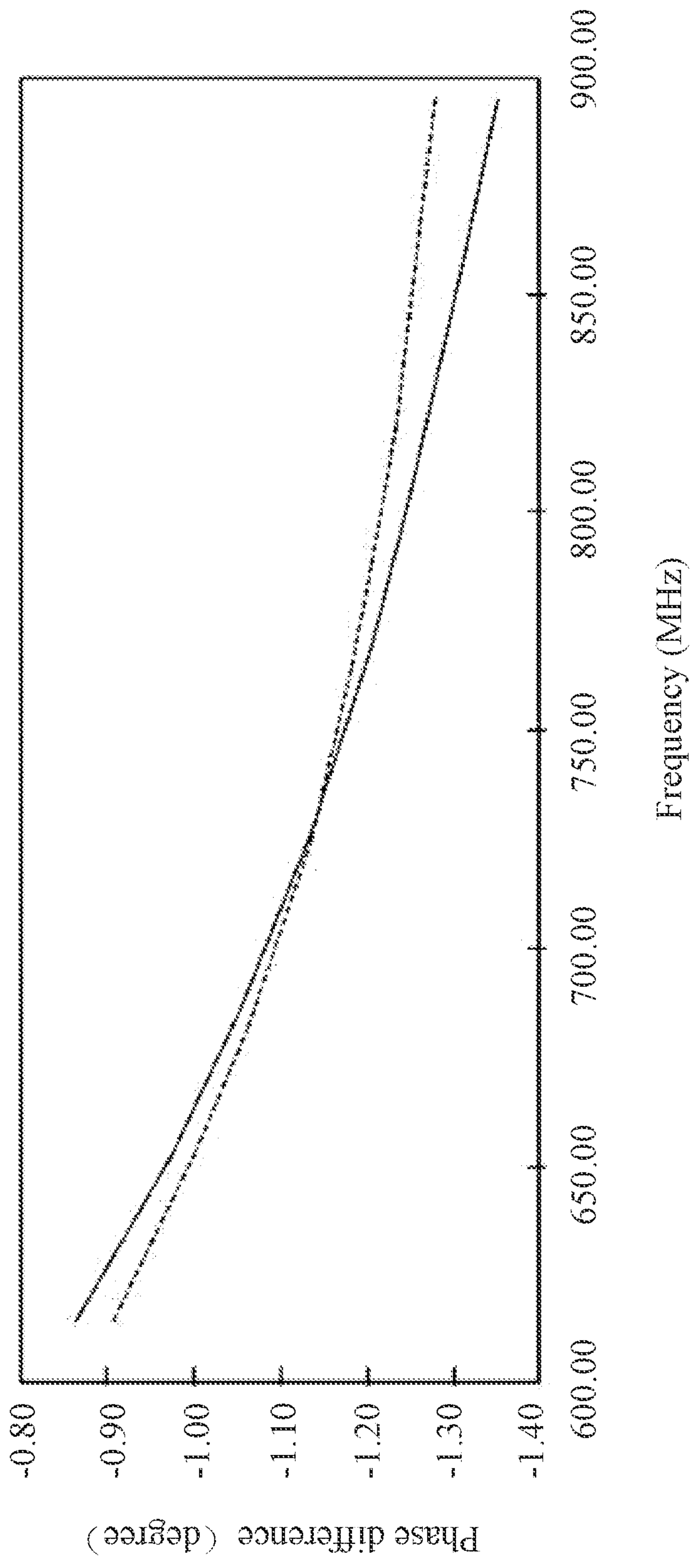
FIG. 12 is a schematic diagram of simulation results of the phase difference of the base station antenna of FIG. 7.

Please refer to FIGS. 7 to 12, wherein FIG. 8 is a schematic diagram of simulation results of the return loss of the base station antenna of FIG. 7, FIG. 9 is a schematic diagram of simulation results of the Smith chart of the base station antenna of FIG. 7, FIG. 10 is a schematic diagram of simulation results of the amplitude of the base station antenna of FIG. 7, FIG. 11 is a schematic diagram of simulation results of the phase of the base station antenna of FIG. 7, and FIG. 12 is a schematic diagram of simulation results of the phase difference of the base station antenna of FIG. 7. It should be noted that the simulation environment of the base station antenna needs to satisfy that the distance from the boundary of the simulation body to the ideal radiation boundary is greater than a quarter wavelength, wherein because the design frequency band of the feed network 4 can be 617 MHz to 894 MHz, the center frequency is 755 MHz, the wavelength at the center frequency 755 MHz in the air is about 400 mm, and a quarter wavelength is 100 mm. That is, the distance from the boundary of the simulated body of the feed network 4 to the ideal radiation boundary needs to be greater than 100 mm. In addition, the simulation result is a result obtained in a simulation scenario where the feed networks 4 are connected to the dipoles with the same polarization direction of the two adjacent radiation units 511 in the second row and the fourth row, respectively.

In FIG. 8, the horizontal axis represents a frequency, and the unit of the frequency is MHz; the vertical axis represents a return loss, and the unit of the return loss is dB; the solid line is the curve of the return loss of the input end 421*a*; and the dashed line is the curve of the return loss of the input end 421*b*. It can be seen from FIG. 8 that the return loss is less than or equal to −28.1 dB, which meets the specifications of the base station antenna: the return loss is less than or equal to −20 dB.

Since the feed network 4 is of a symmetrical design, the convergence curve of the Smith chart of the input end 421*a* approximately coincides with that of the input end 421*b* in FIG. 9. Therefore, only one convergence curve is drawn in FIG. 9. It can be seen from FIG. 9 that the convergence curve converges to the center of the Smith chart, indicating that the feed network 4 has a good impedance matching design.

In FIG. 10, the horizontal axis represents a frequency, and the unit of the frequency is MHz; the vertical axis represents the amplitude flatness, and the unit of the amplitude flatness is dB; the solid line is the curve of the amplitude from the input end 421*a* to the output end 432*a*, the dashed line is the curve of the amplitude from the input end 421*a* to the output end 432*h*, the chain line is the curve of the amplitude from the input end 421*b* to the output end 432*a*, and the dotted line is the curve of the amplitude from the input end 421*h* to the output end 432*b*. It can be seen from FIG. that the amplitude flatness is −6.1 dB to −6.3 dB, which meets the specifications of the base station antenna: the amplitude flatness is −6 dB±1 dB.

In FIG. 11, the horizontal axis represents a frequency, and the unit of the frequency is MHz; the vertical axis represent a phase, and the unit of the phase is degree. Since the feed network 4 is of an equiphase design, the curve of the phase from the input end 421*a* to the output end 432*a* approximately coincides with that from the input end 421*a* to the output end 432*b*; the curve of the phase from the input end 421*b* to the output end 432*a* approximately coincides with that from the input end 421*b* to the output end 4326. Therefore, only two curves are drawn in FIG. 11, wherein the solid line is the curve of the phase from the input end 421*a* to the output end 432*a*, and the dashed line is the curve of the phase from the input end 421*b* to the output end 432*a*. In FIG. 12, the horizontal axis represents a frequency, and the unit of the frequency is the vertical axis represents the phase difference, and the unit of the phase difference is degree; the solid line is the curve of the phase difference between the input end 421*a* to the output end 432*a* and the input end 421*a* to the output end 432*b*, and the dotted line is the curve of the phase difference between the input end 421*b* to the output end 432*a* and the input end 421*h* to the output end 432*b*. Since the feed network 4 is of an equiphase design, the phase difference of the solid line and the dashed line ranges from −0.95° to −1.3" close to 0° (that is, the curve of the phase from the input end 421*a* to the output end 432*a* approximately coincides with that from the input end 421*a* to the output end 432*b*; the curve of the phase from the input end 421*b* to the output end 432*a* approximately coincides with that from the input end 421*b* to the output end 432*b*), which meets the specifications of the base station antenna: the phase difference is ±5°.

Therefore, from FIG. 8 to FIG. 12, it can be seen that the base station antenna 5 using the feed networks 4 meets the specifications of the existing base station antenna, for example, the return loss is less than or equal to −20 dB, the amplitude flatness is −6 dB±1 dB, and the phase difference is ±5°.

Figure 2:
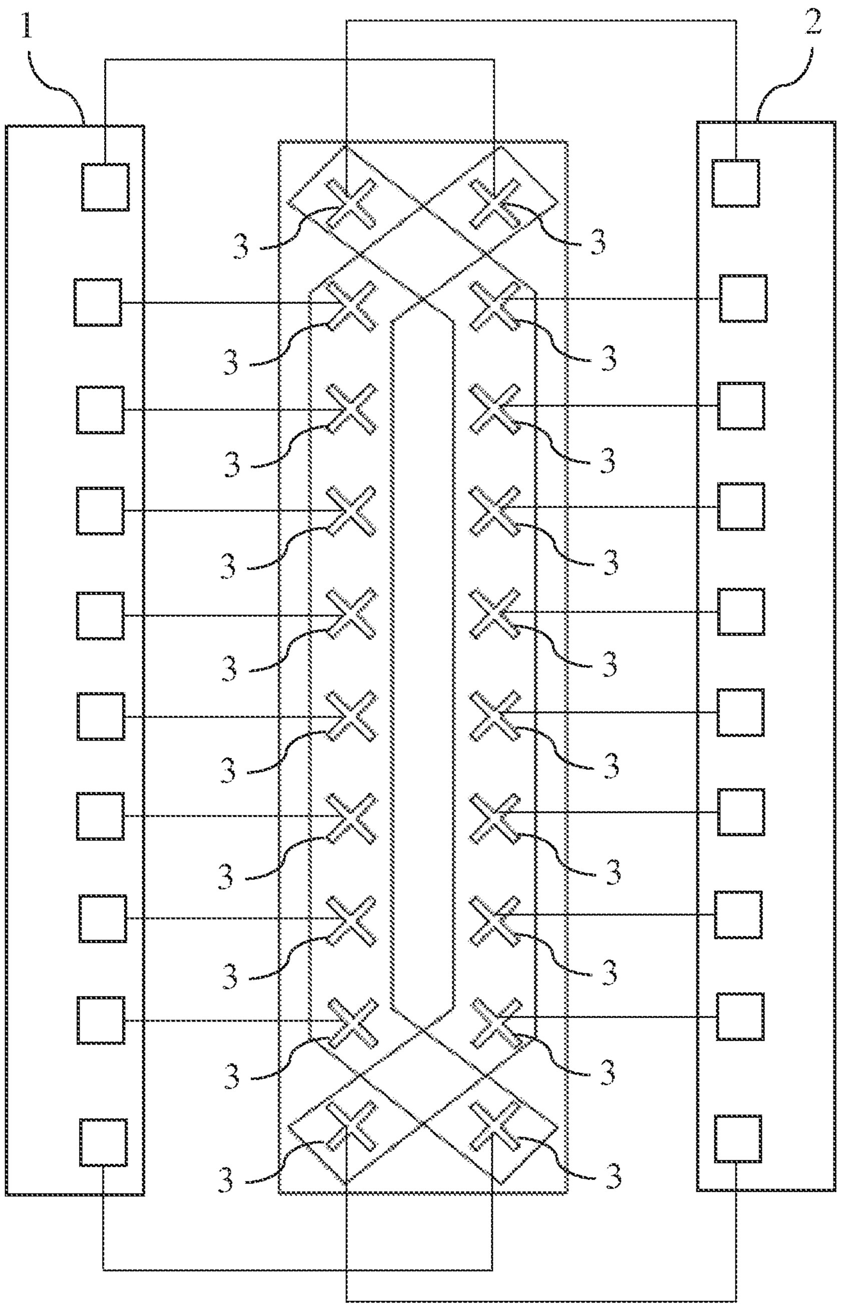
FIG. 2 is a schematic diagram of the connection between a feed network and radiation units with a borrowed configuration according to an embodiment of the existing base station antenna.

Please refer to Table 1, which shows simulation results of directivity, horizontal beam width, front-to-back ratio for cross polarization, and cross polarization discrimination (XPD) at 0 degree by working at seven frequency points of 617 MHz, 650 MHz, 700 MHz, 750 MHz, 800 MHz, 850 MHz, and 894 MHz in the bandwidth of 617-894 MHz through the base station antenna of FIG. 1, the base station antenna of FIG. 2, and the base station antenna of FIG. 7 of the present disclosure. The cross polarization discrimination (XPD) at 0 degree refers to the ratio of the level of the co-polarized signal to the level of the orthogonally polarized signal received by the receiving antenna when the transmitting antenna only transmits the signal with one polarization.

TABLE 1

| | The base Station Antenna of FIG. 1 (Radiation units are with the dislocation configuration) | The base station antenna of FIG. 2 (Radiation units are with the borrowed configuration) | The base station antenna of FIG. 7 (Radiation units are arranged in a linear matrix) |
|---|---|---|---|
| Directivity (dB) | 12.2-14.3 | 12.0-14.9 | 13.5-16.3 |
| Horizontal beam width (degrees) | 42.1-83.6 | 37.4-58.1 | 58.5-66.9 |
| Front-to-back ratio for cross polarization (dB) | 17.6 | 18.5 | 23.5 |
| Cross polarization discrimination (XPD) at 0 degree (dB) | 16.5 | 14.1 | 18.9 |

It can be seen from Table 1 that the directivity of the base station antenna of FIG. 1 is low, and the horizontal beam width of the base station antenna of FIG. 1 does not converge, which cannot meet the requirements for use. The directivity of the base station antenna of FIG. 2 is low, and the horizontal beam width of the base station antenna of FIG. 2 is too narrow, which cannot meet the requirements for use. The base station antenna of FIG. 7 of the present disclosure has the high directivity and the convergent horizontal beam width, which meets the requirements for use.

Figure 13:
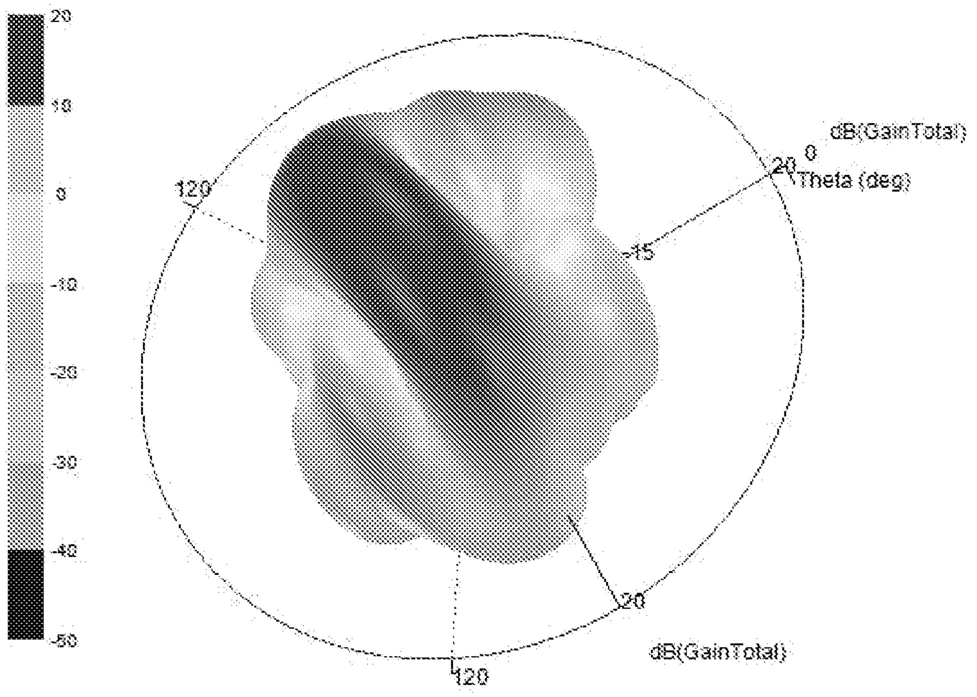
FIG. 13 is a three-dimensional directional diagram of a simulation result of the base station antenna of FIG. 1 at a frequency of 720 MHz.
Figure 14:
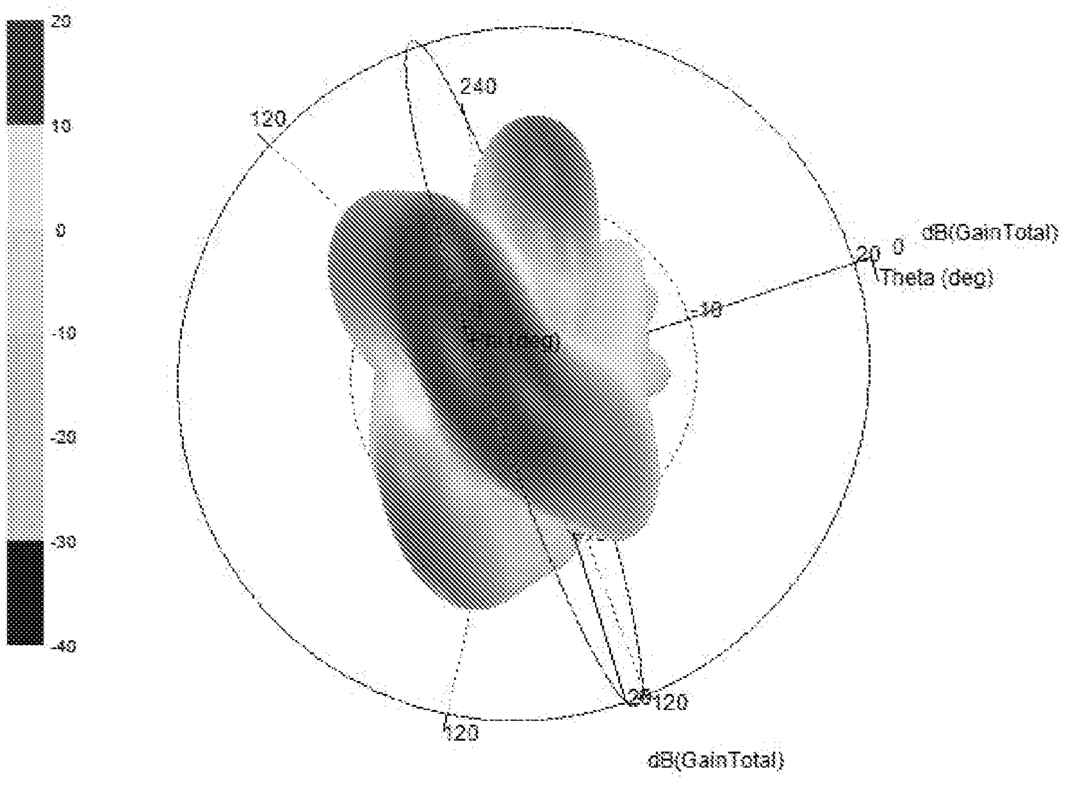
FIG. 14 is a three-dimensional directional diagram of a simulation result of the base station antenna of FIG. 2 at a frequency of 720 MHz.
Figure 15:
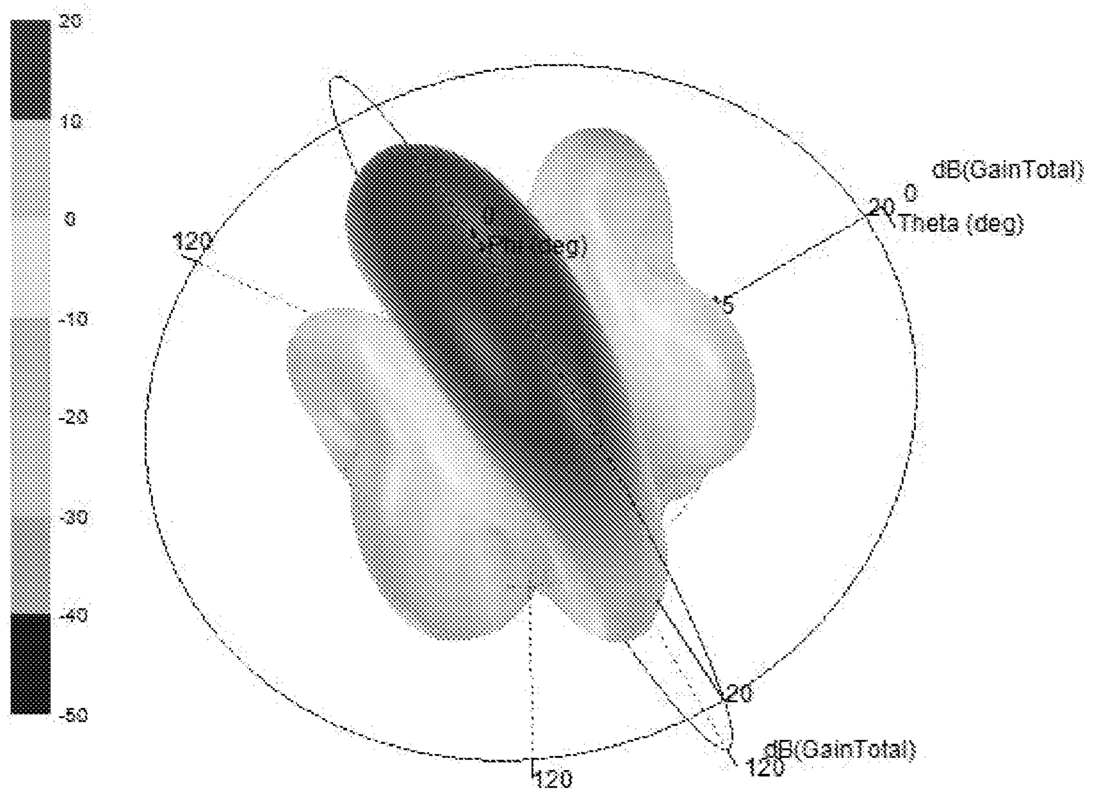
FIG. 15 is a three-dimensional directional diagram of a simulation result of the base station antenna of FIG. 7 at a frequency of 720 MHz.

In addition, please refer to FIG. 13 to FIG. 15, wherein FIG. 13 is a three-dimensional directional diagram of a simulation result of the base station antenna of FIG. 1 at a frequency of 720 MHz, FIG. 14 is a three-dimensional directional diagram of a simulation result of the base station antenna of FIG. 2 at a frequency of 720 MHz, and FIG. 15 is a three-dimensional directional diagram of a simulation result of the base station antenna of FIG. 7 at a frequency of 720 MHz. It can be seen from FIGS. 13 to 15 that there is the serious distortion in the three-dimensional directional diagrams of the base station antenna of FIG. 1 and the base station antenna of FIG. 2, which cannot meet the requirements for use; and there is no distortion in the three-dimensional directional diagram of the base station antenna of FIG. 7 of the present disclosure, which meets the requirements for use.

Figure 16:
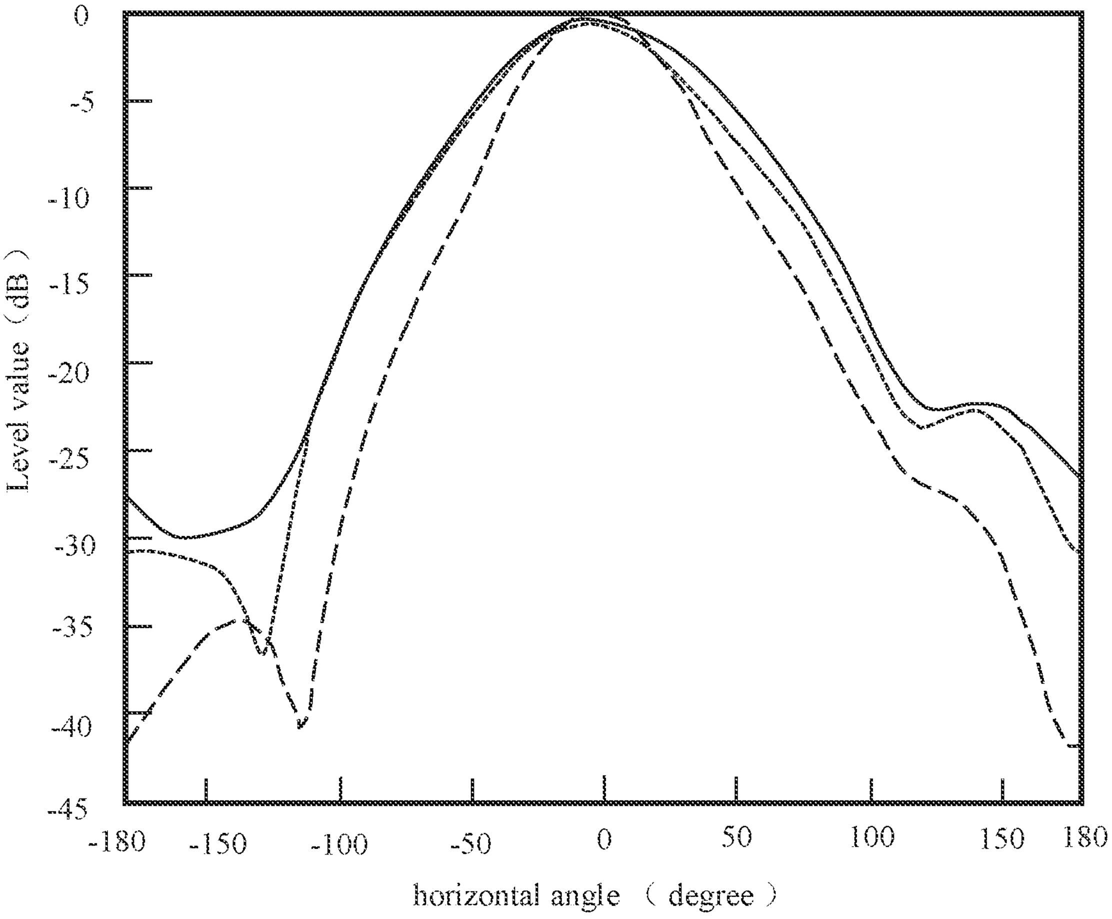
FIG. 16 is a horizontal plane pattern of simulation results of the base station antenna of FIG. 1 in the working frequency band of 617-720 MHz.
Figure 17:
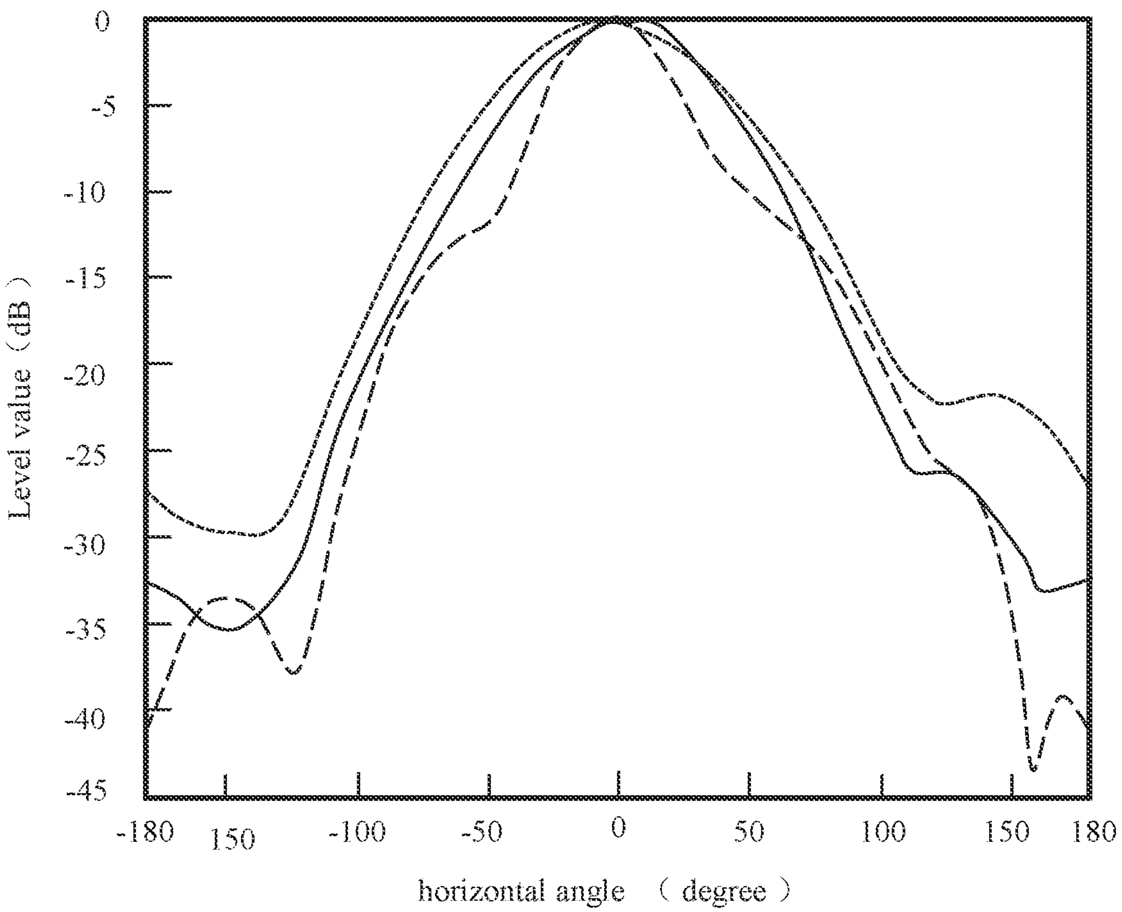
FIG. 17 is a horizontal plane pattern of simulation results of the base station antenna of FIG. 2 in the working frequency hand of 617-720 MHz.
Figure 18:
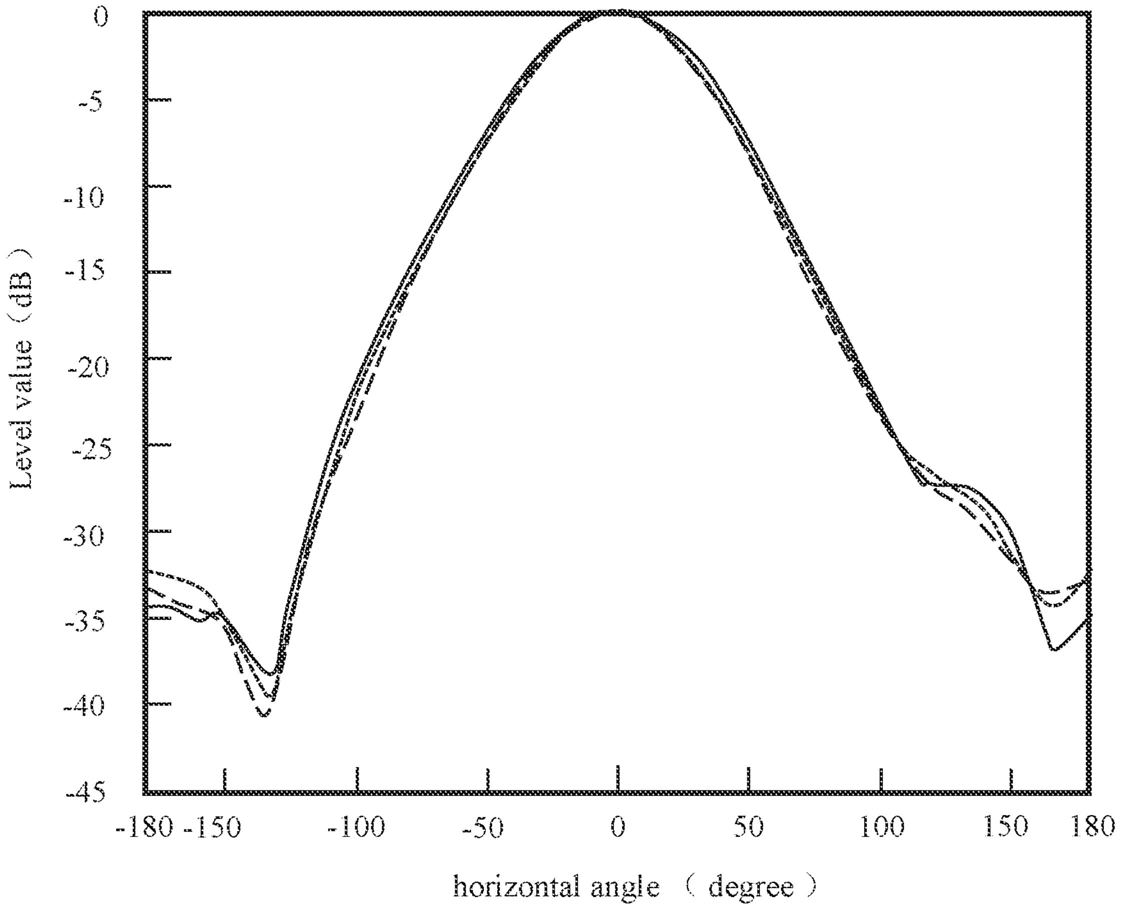
FIG. 18 is a horizontal plane pattern of simulation results of the base station antenna of FIG. 7 in the working frequency band of 617-720 MHz.

In addition, please refer to Table 2 and FIGS. 16 to 18, wherein Table 2 shows simulation results of horizontal beam width and front-to-hack ratio for co-polarization by working at three frequency points of 617 MHz (i.e., the minimum frequency), 750 MHz (i.e., the intermediate frequency), and 894 MHz (i.e., the maximum frequency) in the bandwidth of 617-894 MHz through the base station antenna of FIG. 1, the base station antenna of FIG. 2, and the base station antenna of FIG. 7 of the present disclosure; FIG. 16 is a horizontal plane pattern of simulation results of the base station antenna of FIG. 1 in the working frequency band of 617-720 MHz; FIG. 17 is a horizontal plane pattern of simulation results of the the base station antenna of FIG. 2 in the working frequency band of 617-720 MHz; and FIG. 18 is a horizontal plane pattern of simulation results of the base station antenna of FIG. 7 in the working frequency band of 617-720 MHz.

In FIG. 16 to FIG. 18, the horizontal axis represents a horizontal angle (phi), and the unit of the horizontal angle is degree; the vertical axis represents a level value, and the unit of the level value is dB; the solid line is the simulation curve of the base station antenna working at 617 MHz, the dashed line is the simulation curve of the base station antenna working at 750 MHz, and the dotted line is the simulation curve of the base station antenna working at 894 MHz.

TABLE 2

| | The base Station Antenna of FIG. 1 (Radiation units are with the dislocation configuration) | The base station antenna of FIG. 2 (Radiation units are with the borrowed configuration) | The base station antenna of FIG. 7 (Radiation units are arranged in a linear matrix) |
|---|---|---|---|
| Horizontal beam width (degrees) | 42.1-83.6 | 37.4-58.1 | 58.5-66.9 |
| Front-to-back ratio for co-polarization (dB) | ≤−2.2.5 | ≤−22.1 | ≤−30.3 dB |

In the specifications of the existing base station antenna, the horizontal beam width range is 65°±8°, and the front-to-back ratio for co-polarization is less than or equal to −23 dB. From Table 2 and FIGS. 16 to 18, it can be seen that the base station antenna of FIG. 1 cannot meet the specifications of the existing base station antenna and cannot meet the requirements for use due to the divergence of the horizontal beam width; the base station antenna of FIG. 2 cannot meet the specifications of the existing base station antenna and cannot meet the requirements for use due to the divergence of the horizontal beam width; and the base station antenna of FIG. 7 of the present disclosure can meet the specifications of the existing base station antenna and can meet the requirements for use due to the convergence of the horizontal beam width.

In summary, by the connection relationship between the microstrip power dividers and the microstrip combiners (i.e., the cascade connection of the two power dividers and the two combiners) and the microstrip structure design, the feed network of the embodiments of the present disclosure not only realizes impedance matching, but also realizes the multiple inputs and the multiple outputs. In addition, the feed network can be applied to single-frequency, dual-frequency and multi-frequency base station antennas, wherein all the radiation units of the base station antenna are arranged in a linear matrix, and the radiation units are without the dislocation or borrowed configuration, so that it is easy for the base station antenna to carry out a structural layout, there is less impact on the radiation performance of base station antennas in other frequency bands, and the width of the base station antenna can be effectively reduced, thereby achieving the miniaturization of the base station antenna.

Furthermore, when the feed network is applied to single-frequency, dual-frequency, and multi-frequency base station antennas, by feeding two adjacent radiation units in the same row in the base station antenna, without limiting the number of radiation units of the base station antenna, the horizontal beam width of the base station antenna can be improved, the distortion in the directional diagram of the base station antenna is reduced, the gain of the base station antenna is increased, and the sector interference of the radiation channels between the base station antenna and other base station antennas on the same base station is reduced. Moreover, the feed network of the embodiments of the present disclosure can be configured with two phase shifters to adjust the phase difference between the two output ends of the feed network.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A feed network for feeding two adjacent radiation units in the same row in an antenna array, the feed network comprising:

a printed circuit hoard;

two microstrip power dividers arranged on the printed circuit board, a microstrip structure of each of the two microstrip power dividers configured to realize impedance matching, and input ends of the two microstrip power dividers configured as two input ends of the feed network; and two microstrip combiners arranged on the printed circuit board, two input ends of each of the two microstrip combiners respectively connected to one output end of each of the two microstrip power dividers, and output ends of the two microstrip combiners configured as two output ends of the feed network, so as to realize a multiple-input multiple-output feed network.

2. The feed network according to claim 1, wherein part or all of the two microstrip power dividers are unequal power dividers, and part or all of the two microstrip combiners are unequal combiners.

3. The feed network according to claim 1, wherein each of the two microstrip power dividers is an equal power divider, and each of the two microstrip combiners is an equal combiner.

4. The feed network according to claim 1, wherein each of the two microstrip power dividers is a Wilkinson power divider, and each of the two microstrip combiners is a Wilkinson Combiner.

5. The feed network according to claim 1, wherein the feed network further comprises two phase shifters, respectively connected to the input ends of the two microstrip power dividers to adjust phase difference between the two output ends of the feed network.

6. A base station antenna, comprising:

at least two linear antenna arrays arranged in parallel, d each of the at least two linear antenna arrays including a plurality of radiation units; and the feed network according to claim 1 disposed between the at least two linear antenna arrays, the two output ends of the feed network respectively connected to the two adjacent radiation units in the same row, and the feed network further comprising two phase shifters, which are respectively connected to the input ends of the two microstrip power dividers and radiation units not connected to the feed network to control signal phases of the plurality of radiation units.

7. The base station antenna according to claim 6, wherein each of the plurality of radiation units is a single-polarization radiation unit.

8. The base station antenna according to claim 6, wherein each of the plurality of radiation units is a dual-polarization radiation unit, and the dual-polarization radiation unit includes a first dipole and a second dipole whose polarization directions are orthogonal to each other.

9. The base station antenna according to claim 8, wherein the number of the feed networks is two, and the two feed networks are respectively used to feed the first dipole and the second dipole with different polarization directions in the two adjacent radiation units in the same row.

10. The base station antenna according to claim 6, wherein the base station antenna further comprises a reflector, the at least two linear antenna arrays are installed on a surface of the reflector, and the at least two linear antenna arrays are distributed in an axial symmetry mode with a central axis of the reflector or are asymmetrically distributed along the central axis of the reflector.

11. The base station antenna according to claim 6, wherein part or all of the two microstrip power dividers are unequal power dividers, and part or all of the two microstrip combiners are unequal combiners.

12. The base station antenna according to claim 6, wherein each of the two microstrip power dividers is an equal power divider, and each of the two microstrip combiners is an equal combiner.

13. The base station antenna according to claim 6, wherein each of the two microstrip power dividers is a Wilkinson power divider, and each of the two microstrip combiners is a Wilkinson Combiner.

* * * * *